United States Patent
Sun et al.

(10) Patent No.: US 10,425,945 B2
(45) Date of Patent: Sep. 24, 2019

(54) MULTI-STAGE CHANNEL RESERVATION SIGNAL FOR DIRECTIONAL TRANSMISSION AND RECEPTION

(71) Applicant: QUALCOMM Incorporated, San Diego, CA (US)

(72) Inventors: Jing Sun, San Diego, CA (US); Ahmed Kamel Sadek, San Diego, CA (US); Tamer Adel Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/728,945

(22) Filed: Oct. 10, 2017

(65) Prior Publication Data

US 2018/0103461 A1 Apr. 12, 2018

Related U.S. Application Data

(60) Provisional application No. 62/406,602, filed on Oct. 11, 2016.

(51) Int. Cl.
*H04W 72/04* (2009.01)
*H04W 74/08* (2009.01)
*H04W 16/14* (2009.01)

(52) U.S. Cl.
CPC ......... *H04W 72/046* (2013.01); *H04W 16/14* (2013.01); *H04W 72/04* (2013.01); *H04W 74/0816* (2013.01)

(58) Field of Classification Search
CPC ........... H04W 72/046; H04W 74/0816; H04W 16/14; H04W 72/04

USPC ......................................................... 370/329
See application file for complete search history.

(56) References Cited

U.S. PATENT DOCUMENTS

| | | | |
|---|---|---|---|
| 2009/0034491 A1* | 2/2009 | Adams | H04B 7/2656 370/337 |
| 2009/0143065 A1* | 6/2009 | Mattila | H04L 41/06 455/423 |
| 2010/0232414 A1* | 9/2010 | Jeon | H04W 74/0808 370/347 |
| 2015/0071180 A1* | 3/2015 | Cavalcante | H04W 74/0816 370/329 |
| 2016/0192395 A1 | 6/2016 | Yoo et al. | |
| 2016/0198499 A1* | 7/2016 | Lee | H04W 4/026 455/450 |
| 2016/0261325 A1* | 9/2016 | Ko | H04B 7/0691 |

(Continued)

OTHER PUBLICATIONS

International Search Report and Written Opinion—PCT/US2017/056168—ISA/EPO—dated Jan. 18, 2018.

*Primary Examiner* — Inder P Mehra
(74) *Attorney, Agent, or Firm* — Patterson & Sheridan, LLP

(57) ABSTRACT

Certain aspects of the present disclosure provide techniques for multi-stage channel reservation signals for direction transmission and reception. According to certain aspects, a method of wireless communication by a cell is provided. The method generally includes determining a portion of a shared spectrum for at least one of sending or receiving a transmission and transmitting a plurality of channel reservation signals associated with a plurality of beams to reserve the portion of the shared spectrum.

26 Claims, 9 Drawing Sheets

(56) References Cited

U.S. PATENT DOCUMENTS

2017/0034712 A1* 2/2017 Crinon .................. G06Q 30/02
2018/0132111 A1* 5/2018 Mueck .................. H04W 16/14

* cited by examiner

MULTI-STAGE CHANNEL RESERVATION SIGNAL FOR DIRECTIONAL TRANSMISSION AND RECEPTION

CROSS-REFERENCE TO RELATED APPLICATION & PRIORITY CLAIM

This application claims benefit of and priority to U.S. Provisional Patent Application Ser. No. 62/406,602, filed Oct. 11, 2016, which is herein incorporated by reference in its entirety for all applicable purposes.

BACKGROUND

Field of the Disclosure

Aspects of the present disclosure relate generally to wireless communications systems, and more particularly, to a multi-stage channel reservation signal for directional transmission and reception.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A), code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In LTE or LTE-A network, a set of one or more BSs may define an e NodeB (eNB). In other examples, such a new radio (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., a NR BS, a (NR NB, a network node, 5G NB, a Next Generation NB (gNB), etc.). A BS or DU may communicate with a set of UEs on downlink channels (e.g., for transmissions from a base station or to a UE) and uplink channels (e.g., for transmissions from a UE to a BS or DU).

Multiple access technologies have been adopted in various telecommunication standards to provide a common protocol that enables different wireless devices to communicate on a municipal, national, regional, and even global level. An example of an emerging telecommunication standard is NR, for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in LTE and NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for a multi-stage channel reservation signal for directional transmission and reception.

Certain aspects of the present disclosure provide a method that may be performed, for example, by a cell for channel reservation. The method generally includes determining a portion of a shared spectrum for at least one of sending or receiving a transmission. The method includes transmitting a plurality of channel reservation signals associated with a plurality of beams to reserve the portion of the shared spectrum.

Certain aspects of the present disclosure provide an apparatus such as a cell for channel reservation. The apparatus generally includes means for determining a portion of a shared spectrum for at least one of sending or receiving a transmission. The apparatus includes means for transmitting a plurality of channel reservation signals associated with a plurality of beams to reserve the portion of the shared spectrum.

Certain aspects of the present disclosure provide an apparatus such as a cell for channel reservation. The apparatus generally includes at least one processor coupled with a memory and configured to determine a portion of a shared spectrum for at least one of sending or receiving a transmission. The apparatus includes a transmitter configured to transmit a plurality of channel reservation signals associated with a plurality of beams to reserve the portion of the shared spectrum.

Certain aspects of the present disclosure provide a computer readable medium having computer executable code stored thereon for channel reservation by a cell. The code generally includes code for determining a portion of a shared spectrum for at least one of sending or receiving a transmission and code for transmitting a plurality of channel reservation signals associated with a plurality of beams to reserve the portion of the shared spectrum.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
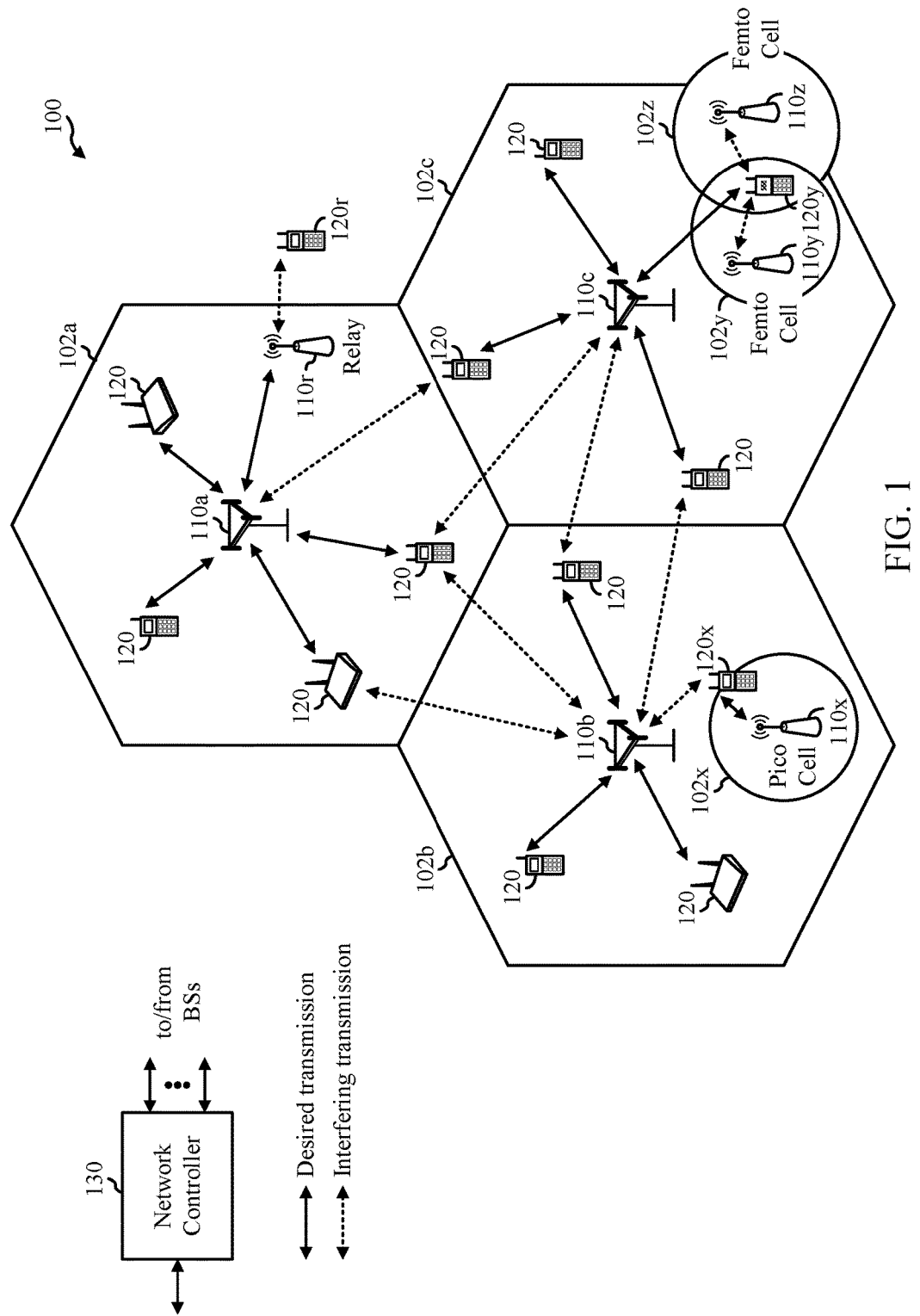
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as millimeter wave (mmW) targeting high carrier frequency (e.g., 27 GHz or beyond), massive multiple-input multiple-output (MIMO), etc.

In some cases, such systems may reserve channel resources from the spectrum using a channel reservation signal. However, the ideal beam may not be known, the transmission target may not be known, there may be a power imbalance, etc.

Aspects of the present disclosure provide techniques and apparatus for a multi-stage channel reservation for direction communications. For example, a cell may determine a portion of a shared spectrum (e.g., a channel) to reserve for transmitting and/or receiving. The cell may transmit multiple channel reservation signals associated with a plurality of beams to reserve the portion of the shared spectrum. The cell may also determine one or multiple beam directions for sending the channel reservation signals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100 in which aspects of the present disclosure may be performed. For example, the wireless network 100 may be a new radio (NR) or 5G network. A cell, such as a BS 110 may determine a portion of a shared spectrum (e.g., a channel) to reserve for sending or receiving transmissions. The BS 110 may send multiple (e.g., a plurality of) channel reservation signals to reserve the portion of the shared spectrum. The BS 110 may determine one or more beam directions for sending the plurality of channel reservation signals.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and Next Generation Node B (gNB), NB, 5G NB, access point (AP), NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE networks) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of two half frames, each half frame including 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
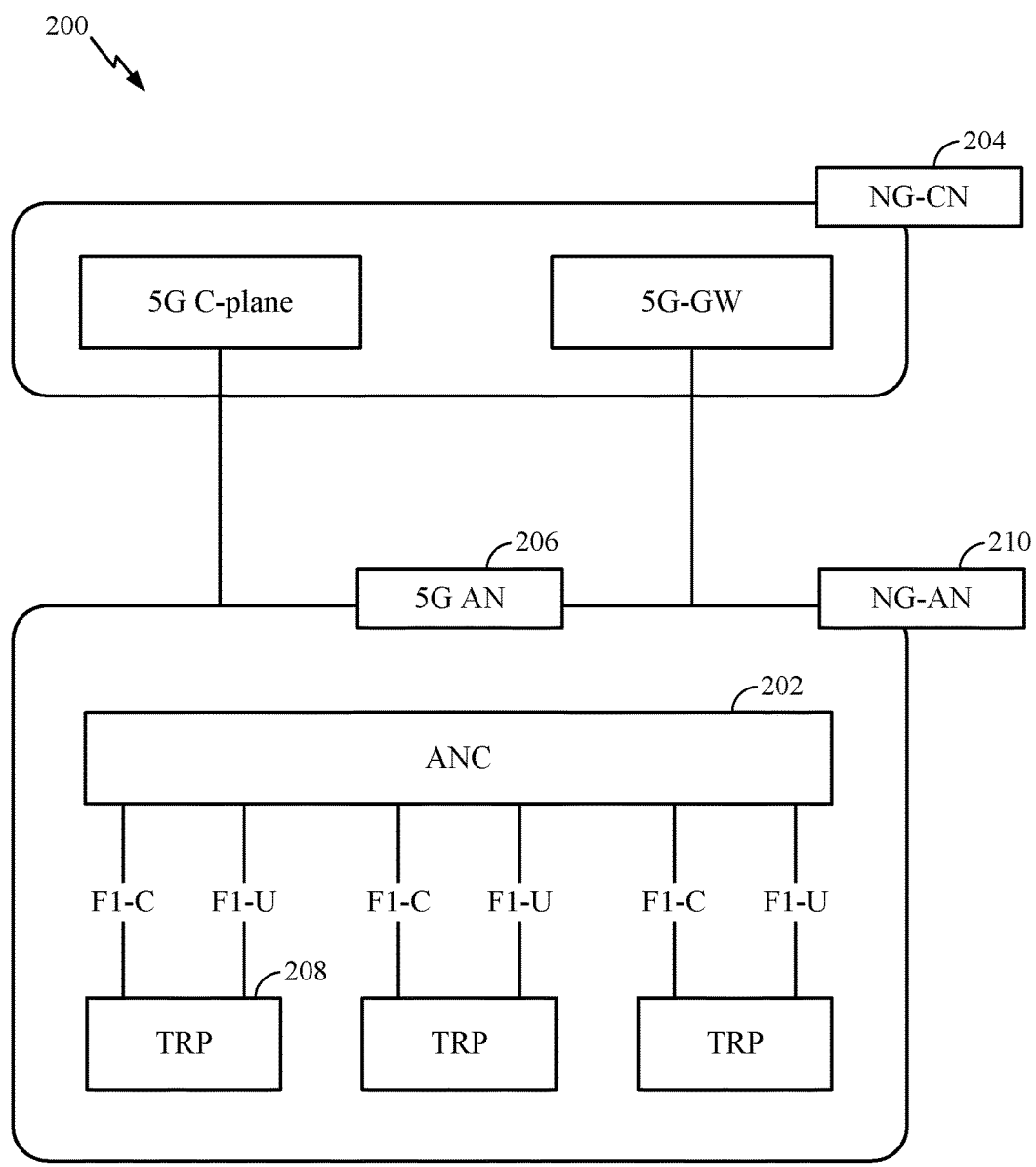
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, gNBs, NR BSs, NBs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter).

The logical architecture may share features and/or components with LTE. NG-AN 210 may support dual connectivity with NR. The NG-AN 210 may share a common fronthaul for LTE and NR.

The logical architecture may enable cooperation between and among TRPs 208. For example, cooperation may be preset within a TRP and/or across TRPs via the ANC 202. No inter-TRP interface may be needed/present.

The logical architecture may support a dynamic configuration of logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a CU (e.g., ANC 202) and/or one or more DUs (e.g., one or more TRPs 208).

Figure 3:
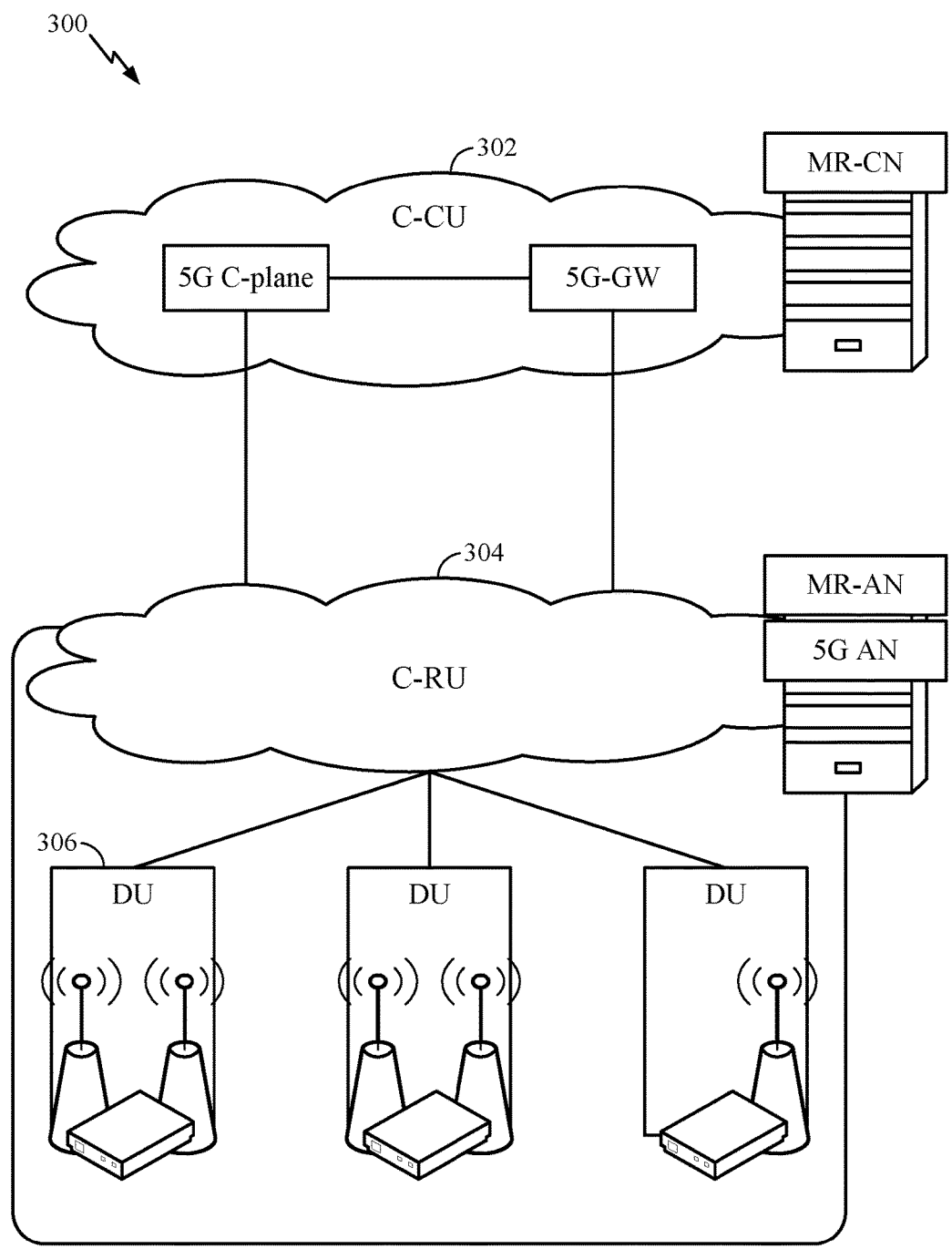
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be near to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
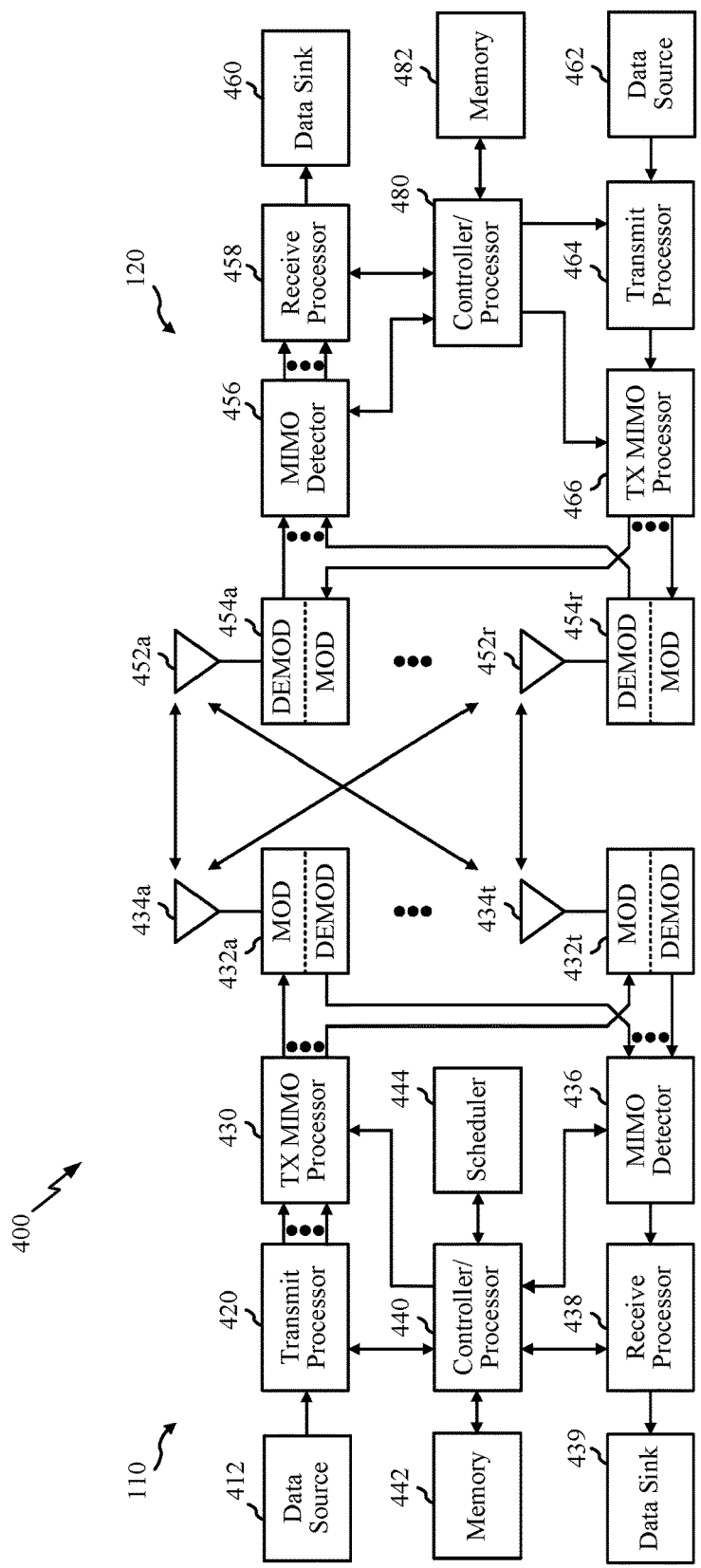
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9 and 10. Processors of the BS 110 may determine a portion of a spectrum for transmission and/or reception. Transmit chain components of the BS 110 may send multiple channel reservation signals to reserve the portion of the spectrum.

For a restricted association scenario, the BS 110 may be the macro BS 110*c* in FIG. 1, and the UE 120 may be the UE 120*y*. The BS 110 may also be a BS of some other type. The BS 110 may be equipped with antennas 434*a* through 434*t*, and the UE 120 may be equipped with antennas 452*a* through 452*r*.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the processes for the techniques described herein. The processor 440 and/or other processors and modules at the BS 110 may also perform or direct, for example, the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
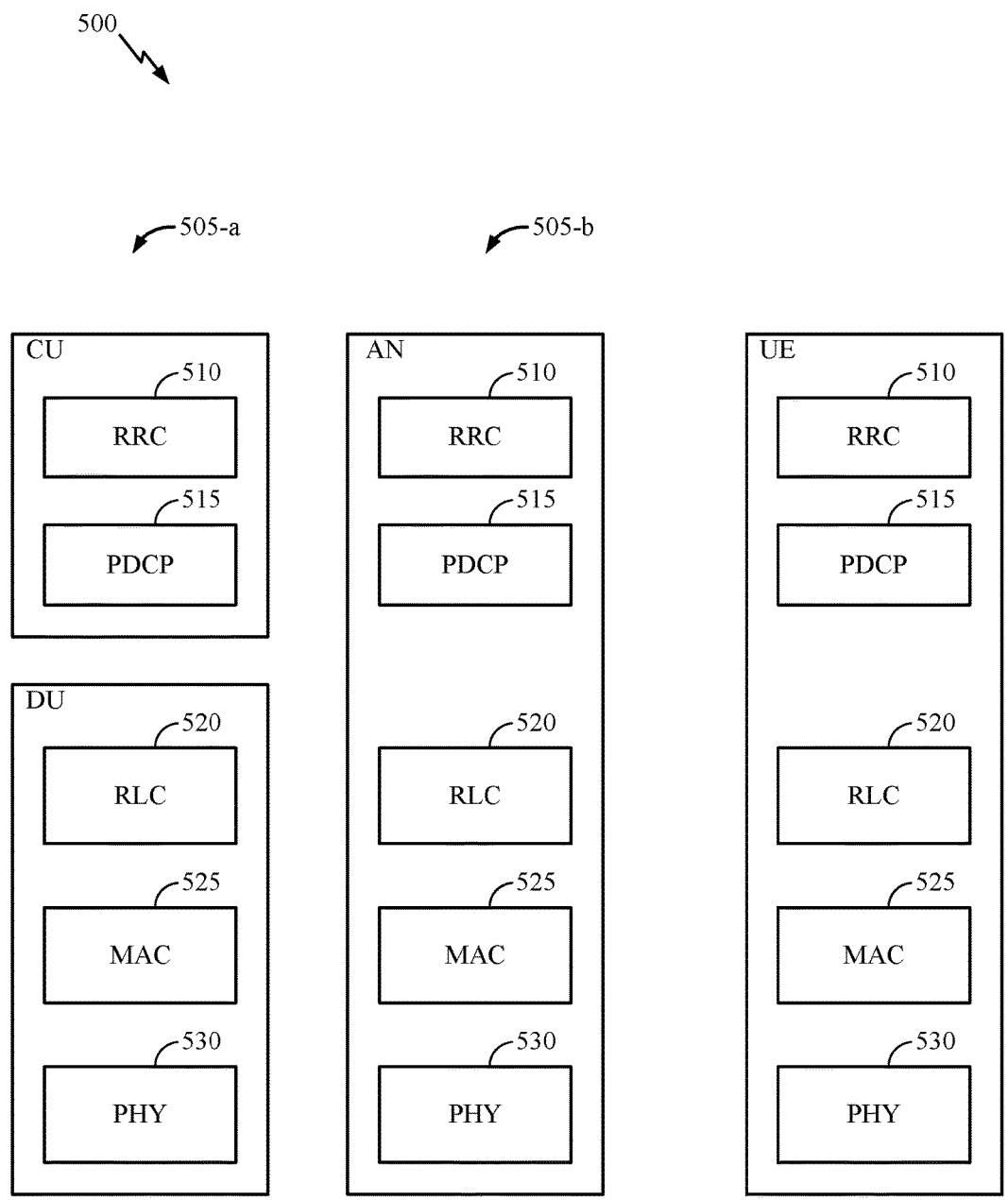
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., AN, NR BS, a NR NB, a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
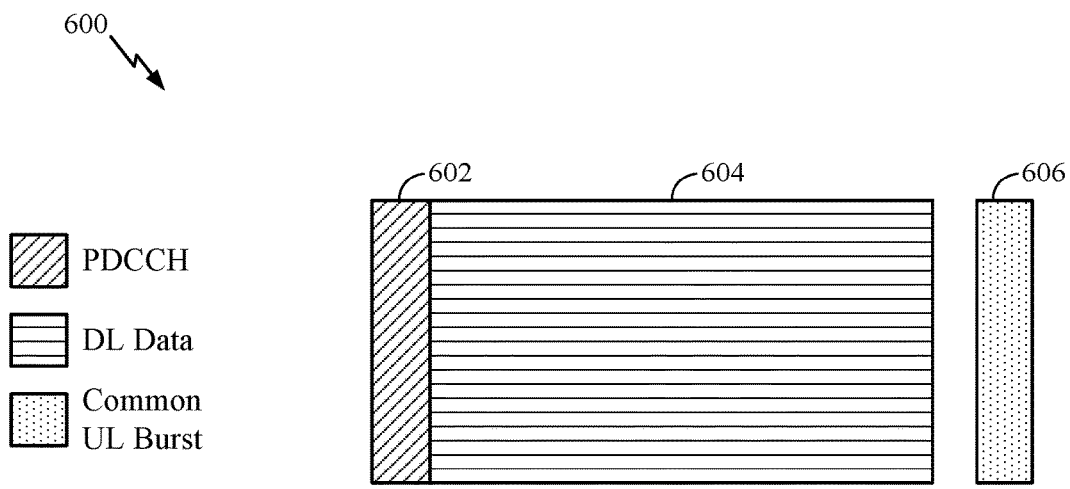
FIG. 6 illustrates an example of a downlink-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 6008. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
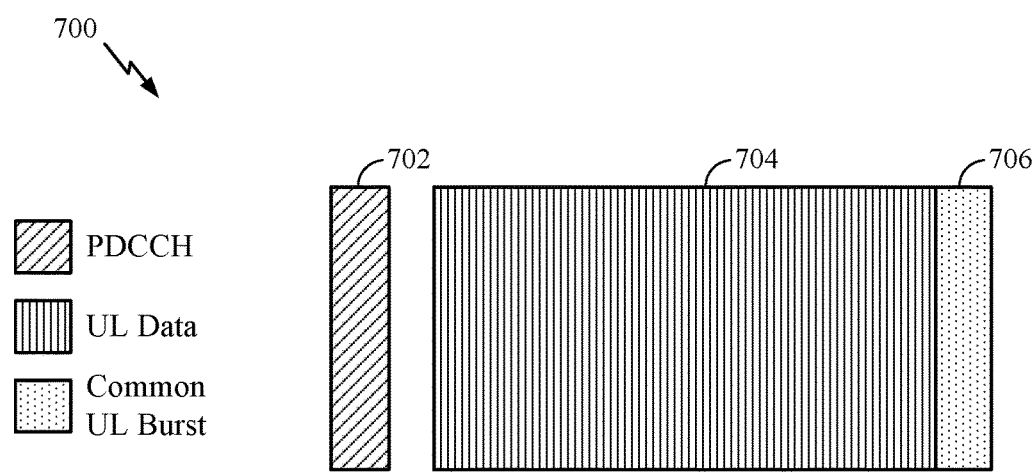
FIG. 7 illustrates an example of an uplink-centric subframe, in accordance with certain aspects of the present disclosure.

FIG. 7 is a diagram showing an example of an UL-centric subframe 700. The UL-centric subframe may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
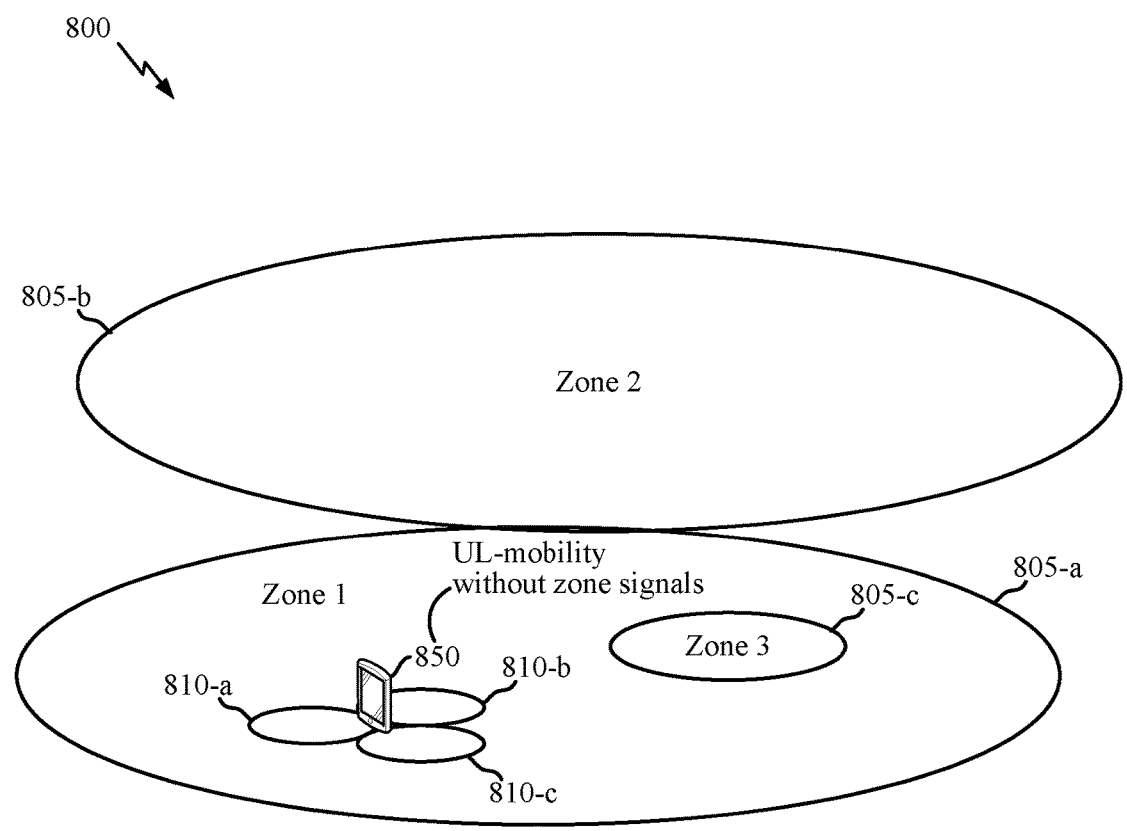
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-*a* (Zone 1), a second zone 805-*b* (Zone 2), and a third zone 805-*c* (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-*a* and the second zone 805-*b*) and overlapping zones (e.g., the first zone 805-*a* and the third zone 805-*c*). In some examples, the first zone 805-*a* and the second zone 805-*b* may each include one or more macro cells, micro cells, or pico cells, and the third zone 1105-*c* may include one or more femto cells.

By way of example, the UE 850 is shown to be located in the first zone 805-*a*. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-*a* may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-*a* (e.g., a first cell 810-*a*, a second cell 810-*b*, and a third cell 810-*c*) may monitor the dedicated set of resources for the pilot signal of the UE 850.

EXAMPLE MULTI-STAGE CHANNEL RESERVATION SIGNAL FOR DIRECTIONAL TRANSMISSION AND RECEPTION

Certain communication systems, such as new radio (NR) access technology system or 5G technology system (e.g., wireless network 100), may support various wireless communication services, such as millimeter wave (mmW) targeting high carrier frequency (e.g., 27 GHz or beyond), massive machine type communications (mMTC) targeting non-backward compatible MTC techniques, etc.

Some communication systems, for example mmW systems, may use analog and/or digital beamforming. Beamforming may compensate for high path-losses due to poor radio frequency (RF) propagation. In some cases, wireless devices (e.g., such as a base station (BS) 110 and user equipment (UE) 120) may use beam sweeping procedures to allow the receiver to identify the best transmit beam. The receiver may then align its receive beam with the identified best transmit beam.

In an unlicensed and/or shared spectrum, channel reservation can be used to reduce collisions by transmissions by different nodes accessing the unlicensed/shared spectrum. For example, in certain wireless local area networks (e.g., WiFi), wireless devices can transmit request to send (RTS) and clear to send (CTS) signals for channel reservation.

For directional transmission (e.g., transmission using beamforming), such as in mmW and massive MIMO systems, directional channel reservation signals may be used. Directional channel reservation may assume the node (e.g., cell) knows the direction in which the data transmission or reception occurs. For data transmission, the node sends a channel reservation for transmission (CR-T) signal (e.g., similar to the RTS signal) in that direction. For data reception, the node may send a channel reservation for reception (CR-R) signal (e.g., similar to the CTS signal) in that direction In some cases, however, the ideal (e.g., best) data transmission direction may not be known. Further, in some cases, the data transmission target may not be decided, such as in the case that the cell serves multiple UEs. In some cases, a transmit power imbalance may exist across nodes.

Accordingly, techniques and apparatus for channel reservation for directional transmissions and/or reception are desired.

Aspects of the present disclosure provide techniques and apparatus for a multi-stage channel reservation signal for directional transmission and reception.

Figure 9:
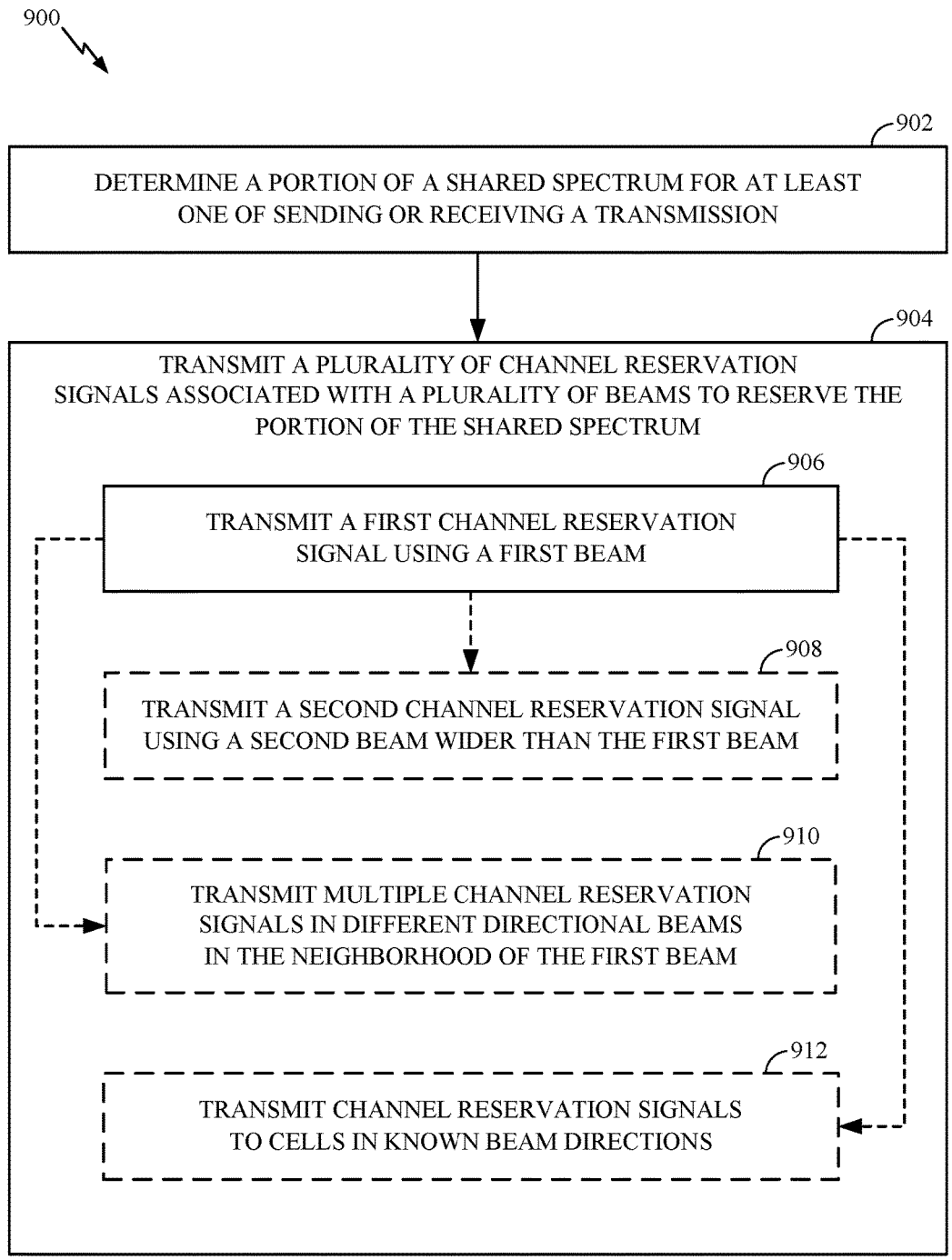
FIG. 9 is a flow diagram illustrating example operations that may be performed by a cell for channel reservation, in accordance with certain aspects of the present disclosure.

FIG. 9 is a flow diagram illustrating example operations 900 that may be performed, for example, by a cell (e.g., a BS 110) for channel reservation, in accordance with certain aspects of the present disclosure. Operations 900 may begin, at 902, by determining a portion of a shared spectrum (e.g., a channel) for at least one of sending or receiving a transmission. The portion of the shared spectrum, for example, may correspond to a channel being used for communications. The BS may determine one or more beam directions for sending the channel reservation signals.

At 904, the BS transmits (e.g., sequentially in time) a plurality of (e.g., a multi-stage) channel reservation signals (e.g., CR-T and/or CR-R signals) to reserve the determined portion of the spectrum (e.g., channel). The plurality of channel reservation signals are associated with a plurality of beams. The plurality of channel reservation signals may be transmitted to a plurality of neighboring cells. For example, the channel reservation signals may be sent to multiple (e.g., a plurality) neighboring cells that may be interfered, potentially interfered, interfering, or potentially interfering with respect to transmissions to and/or from the BS (e.g., to/from its served UEs).

The BS may transmit the multiple channel reservation signals using time-division multiplexing (TDM) over different beams. The multiple channel reservation signals may carry the same information—for example, reserve the same portion of the shared spectrum.

The use of multiple channel reservation signals may allow the cell to clear a larger area (e.g., signal a larger number of neighboring cells) than a single channel reservation signal. For example, the BS may send multiple channel reservation signals (e.g., CR-R signals) to reserve the channel (e.g., a portion of shared spectrum) from a larger set of neighboring cells (e.g., interfering nodes) for reception (e.g., to protect the received transmission). The BS may send multiple channel reservation signals (e.g., CR-T signals) to announce a transmission to a larger set of neighboring cells (e.g., interfered nodes) to allow the set of neighboring cells to prepare for interference.

According to certain aspects, the BS transmits the plurality of channel reservations signals using different beams and/or beam directions. For example, as shown in FIG. 9, at 906, the BS may send a first channel reservation signal using a first beam (e.g., original beam). In one example, optionally, at 908, the BS may send a second channel reservation signal using a second beam wider than the first beam. The wider beam may be an omni-directional beam. The wider beam can cover a wider angle.

In another example, in addition to the first channel reservation signal using the first beam, optionally, at 910, the BS may send multiple channel reservation signals using multiple different direction beams. In some cases, the different direction beams may be in the neighborhood (e.g., in a similar direction) of the original (e.g., first) beam. The channel reservation signals transmitted in multiple directions may have a larger antenna gain than a wider beam (e.g., an omni-directional beam).

Transmission of channel reservation signals using the wider beam (e.g., the omni-directional beam) and/or transmission of multiple channel reservation signals in a similar direction may be useful in cases where there is ambiguity on the beam to be used later. For example, these multi-stage channel reservation signals may be useful in cases where the beam is under a beam tracking mechanism that updates the beam, the channel reservation signal is sent before the beam tracking refinement, and the data transmission/reception beam changed, though still remains in the same neighborhood.

According to certain aspects, the BS may know (e.g., determine, be aware of, and/or be indicated) at least some of the neighboring cells (e.g., interfering/interfered nodes). Thus, the BS may know the beam direction for those cells. As shown in FIG. 9, optionally, at 912, the BS may transmit channel reservation signals to those cells in the known directions. Thus, those neighboring cells may be explicitly cleared (e.g., indicated of the reserved portion to protect/reserve the portion of the spectrum from transmissions by those known neighbors). The BS may have some knowledge from historical measurements on which neighboring cells are the dominant interferers/victims and the direction of those cells.

According to certain aspects, a combination of the above approaches may be used. For example, channel reservations signals using multiple beams, wider beams, omni-directional beams, beams in a similar direction, and/or beams in known directions may be used. This approach may be useful in cases that the cell has some knowledge, for example, from history measurement on which neighboring cells are the dominant interferers/victims and their direction. The extra channel reservation transmissions (e.g., signals) may explicitly point to the directions of those nodes.

Figure 10:
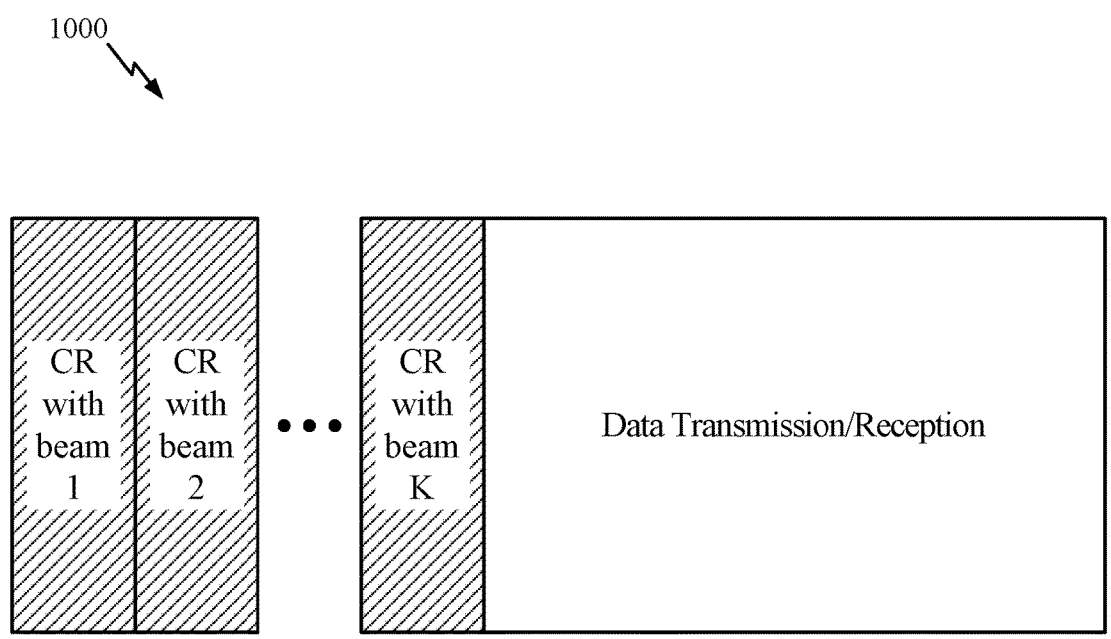
FIG. 10 is a transmission timeline diagram illustrating transmission of multiple channel reservation signals associated with a plurality of beams, in accordance with certain aspects of the present disclosure, in accordance with certain aspects of the present disclosure.

FIG. 10 is a transmission timeline diagram 1000 illustrating transmission of multiple channel reservation signals associated with a plurality of beams, in accordance with certain aspects of the present disclosure. As shown in FIG. 10, the multiple channel reservation signals (e.g., CR with beam 1, CR with beam 2, CR with beam K) may be transmitted sequentially in time and with different beams. In one example, the successive channel reservation signals may be sent immediately (e.g., within nanoseconds) one after the other. As shown in FIG. 10, data transmission and/or reception may follow the channel reservation, for example, performed on the reserved portion of the spectrum.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   determining a portion of a shared spectrum for at least one of sending or receiving a transmission; and
   transmitting a plurality of channel reservation signals associated with a plurality of beams to reserve the portion of the shared spectrum, wherein a first channel reservation signal of the plurality of channel reservation signals is transmitted using a first beam and a second channel reservation signal of the plurality of channel reservation signals is transmitted using a second beam wider than the first beam.

2. The method of claim 1, wherein the plurality of channel reservation signals each reserves the same portion of the shared spectrum.

3. The method of claim 1, wherein the plurality of channel reservation signals are transmitted sequentially in time.

4. The method of claim 1, wherein the second beam comprises an omni-directional beam.

5. A method for wireless communications, comprising:
   determining a portion of a shared spectrum for at least one of sending or receiving a transmission; and
   transmitting a plurality of channel reservation signals associated with a plurality of beams to reserve the portion of the shared spectrum, wherein the plurality of channel reservation signals are transmitted to a plurality of neighboring cells to reserve the portion of the shared spectrum from a set of the plurality of neighboring cells.

6. The method of claim 5, wherein one or more of the plurality of channel reservation signals are transmitted using different beams.

7. The method of claim 6, wherein the different beams comprise beams with a similar direction with respect to each other.

8. The method of claim 6, wherein the different beams comprise beams with a different direction with respect to each other.

9. The method of claim 5, wherein one or more of the plurality of channel reservation signals are transmitted to one or more known neighboring cells using one or more known beam directions.

10. An apparatus for wireless communications, comprising:
- means for determining a portion of a shared spectrum for at least one of sending or receiving a transmission; and
- means for transmitting a plurality of channel reservation signals associated with a plurality of beams to reserve the portion of the shared spectrum, wherein a first channel reservation signal of the plurality of channel reservation signals is transmitted using a first beam and a second channel reservation signal of the plurality of channel reservation signals is transmitted using a second beam wider than the first beam.

11. The apparatus of claim 10, wherein the plurality of channel reservation signals each reserves the same portion of the shared spectrum.

12. The apparatus of claim 10, wherein the plurality of channel reservation signals are transmitted sequentially in time.

13. The apparatus of claim 10, wherein the second beam comprises an omni-directional beam.

14. An apparatus for wireless communications, comprising:
- means for determining a portion of a shared spectrum for at least one of sending or receiving a transmission; and
- means for transmitting a plurality of channel reservation signals associated with a plurality of beams to reserve the portion of the shared spectrum, wherein the plurality of channel reservation signals are transmitted to a plurality of neighboring cells to reserve the portion of the shared spectrum from a set of the plurality of neighboring cells.

15. The apparatus of claim 14, wherein one or more of the plurality of channel reservation signals are transmitted using different beams.

16. The apparatus of claim 15, wherein the different beams comprise beams with a similar direction with respect to each other.

17. The apparatus of claim 15, wherein the different beams comprise beams with a different direction with respect to each other.

18. The apparatus of claim 14, wherein one or more of the plurality of channel reservation signals are transmitted to one or more known neighboring cells using one or more known beam directions.

19. An apparatus for wireless communications, comprising:
- at least one processor coupled with a memory and configured to determine a portion of a shared spectrum for at least one of sending or receiving a transmission; and
- a transmitter configured to transmit a plurality of channel reservation signals associated with a plurality of beams to reserve the portion of the shared spectrum, wherein a first channel reservation signal of the plurality of channel reservation signals is transmitted using a first beam and a second channel reservation signal of the plurality of channel reservation signals is transmitted using a second beam wider than the first beam.

20. The apparatus of claim 19, wherein the second beam comprises an omni-directional beam.

21. An apparatus for wireless communications, comprising:
- at least one processor coupled with a memory and configured to determine a portion of a shared spectrum for at least one of sending or receiving a transmission; and
- a transmitter configured to transmit a plurality of channel reservation signals associated with a plurality of beams to reserve the portion of the shared spectrum, wherein the plurality of channel reservation signals are transmitted to a plurality of neighboring cells to reserve the portion of the shared spectrum from a set of the plurality of neighboring cells, and wherein one or more of the plurality of channel reservation signals are transmitted using different beams.

22. The apparatus of claim 21, wherein the different beams comprise beams with a similar direction with respect to each other.

23. A computer readable medium having computer executable code stored thereon for wireless communications, comprising:
- code for determining a portion of a shared spectrum for at least one of sending or receiving a transmission; and
- code for transmitting a plurality of channel reservation signals associated with a plurality of beams to reserve the portion of the shared spectrum, wherein a first channel reservation signal of the plurality of channel reservation signals is transmitted using a first beam and a second channel reservation signal of the plurality of channel reservation signals is transmitted using a second beam wider than the first beam.

24. The computer readable medium of claim 23, wherein the second beam comprises an omni-directional beam.

25. A computer readable medium having computer executable code stored thereon for wireless communications, comprising:
- code for determining a portion of a shared spectrum for at least one of sending or receiving a transmission; and
- code for transmitting a plurality of channel reservation signals associated with a plurality of beams to reserve the portion of the shared spectrum, wherein the plurality of channel reservation signals are transmitted to a plurality of neighboring cells to reserve the portion of the shared spectrum from a set of the plurality of neighboring cells, and wherein one or more of the plurality of channel reservation signals are transmitted using different beams.

26. The computer readable medium of claim 25, wherein the different beams comprise beams with a similar direction with respect to each other.

* * * * *